(12) United States Patent
Hodjat

(10) Patent No.: US 7,056,244 B2
(45) Date of Patent: Jun. 6, 2006

(54) BELT INSTALLATION TOOL

(75) Inventor: Yahya Hodjat, Oxford, MI (US)

(73) Assignee: The Gates Corporation, Denver, CO (US)

( * ) Notice: Subject to any disclaimer, the term of this patent is extended or adjusted under 35 U.S.C. 154(b) by 184 days.

(21) Appl. No.: 10/767,311

(22) Filed: Jan. 29, 2004

(65) Prior Publication Data

US 2005/0170923 A1 Aug. 4, 2005

(51) Int. Cl.
*F16H 7/24* (2006.01)

(52) U.S. Cl. ...................................... 474/130
(58) Field of Classification Search ................ 474/130
See application file for complete search history.

(56) References Cited

U.S. PATENT DOCUMENTS

| 368,094 | A | * | 8/1887 | Knight | 474/130 |
| 551,486 | A | * | 12/1895 | Brion | 474/130 |
| 5,318,479 | A | | 6/1994 | Lawroski | 474/130 |
| 5,653,654 | A | | 8/1997 | Davis | 474/119 |
| 6,402,649 | B1 | | 6/2002 | Amkreutz | 474/130 |
| 2003/0211910 | A1 | | 11/2003 | Gerring et al. | 474/130 |

FOREIGN PATENT DOCUMENTS

WO    WO 03/095863    11/2003

\* cited by examiner

*Primary Examiner*—Vicky A. Johnson
(74) *Attorney, Agent, or Firm*—J. A. Thurnau, Esq.; C. H. Castleman, Esq.; J. L. Mahurin, Esq.

(57) ABSTRACT

A belt installation tool for installing a belt without rotating the pulley or the tool about a pulley axis of rotation. The tool comprises a ramp that engages a pulley flange. The ramp comprises a connecting member for connecting the ramp to the flange. After the ramp is connected to a pulley flange a belt is loosely engaged with the ramp. A first lever arm connected to the ramp is used to pry the ramp and belt outward by pivoting about the first connecting member until a second connecting member is engaged with the pulley flange. The ramp further comprises a member for laterally urging the belt. Once the ramp is fixed on the pulley flange a second lever arm, connected at a pivot point, urges the belt laterally onto the pulley. The second lever arm is moveable in a direction normal to the movement of the first lever arm, thereby laterally urging the belt onto a pulley.

7 Claims, 3 Drawing Sheets

US 7,056,244 B2

BELT INSTALLATION TOOL

FIELD OF THE INVENTION

The invention relates to a belt installation tool and more particularly to a belt installation tool for installing a belt on a pulley without rotating the pulley or tool.

BACKGROUND OF THE INVENTION

Belts can be installed on belt drive pulley systems using various methods. For systems with an automatic tensioning device, or tensioner, the tensioner is loaded, a belt is placed on the system pulleys, and the tensioner is released to engage the belt. For belt drive systems without a tensioner, a belt is wrapped around the pulleys and then a pulley is moved or tightened to its final location by a bracket, jackscrew idler, or similar device.

Ramp type devices are also known. The ramp is connected to or engaged with a pulley. Most ramp loading devices require rotation of the pulleys or the tool or both. In many systems this is not practical, for example, engine crankshaft resistance is too high, or, the lubrication system is not operating risking damage to bearings and rotating parts.

Representative of the art is PCT application number WO 03/095863 A2 which discloses a tool for installation and removal of power transmission belts from fixed center pulleys in a power transmission system.

What is needed is a belt installation tool which is used to install a belt without rotating the tool or a pulley about a pulley axis of rotation. The present invention meets this need.

SUMMARY OF THE INVENTION

The primary aspect of the invention is to provide a belt installation tool which is used to install a belt without rotating the tool or a pulley about a pulley axis of rotation.

Other aspects of the invention will be pointed out or made obvious by the following description of the invention and the accompanying drawings.

The invention comprises a belt installation tool for installing a belt without rotating the pulley or the tool. The tool comprises a ramp that engages a pulley flange. The ramp comprises a connecting member for connecting the ramp to the flange. After the ramp is connected to a pulley flange a belt is loosely engaged with the ramp. A first lever arm connected to the ramp is used to pry the ramp and belt outward by pivoting about the first connecting member until a second connecting member is engaged with the pulley flange. The ramp further comprises a member for laterally urging the belt. Once the ramp is fixed on the pulley flange a second lever arm, connected at a pivot point, urges the belt laterally onto the pulley. The second lever arm is moveable in a direction normal to the movement of the first lever arm, thereby laterally urging the belt onto a pulley.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
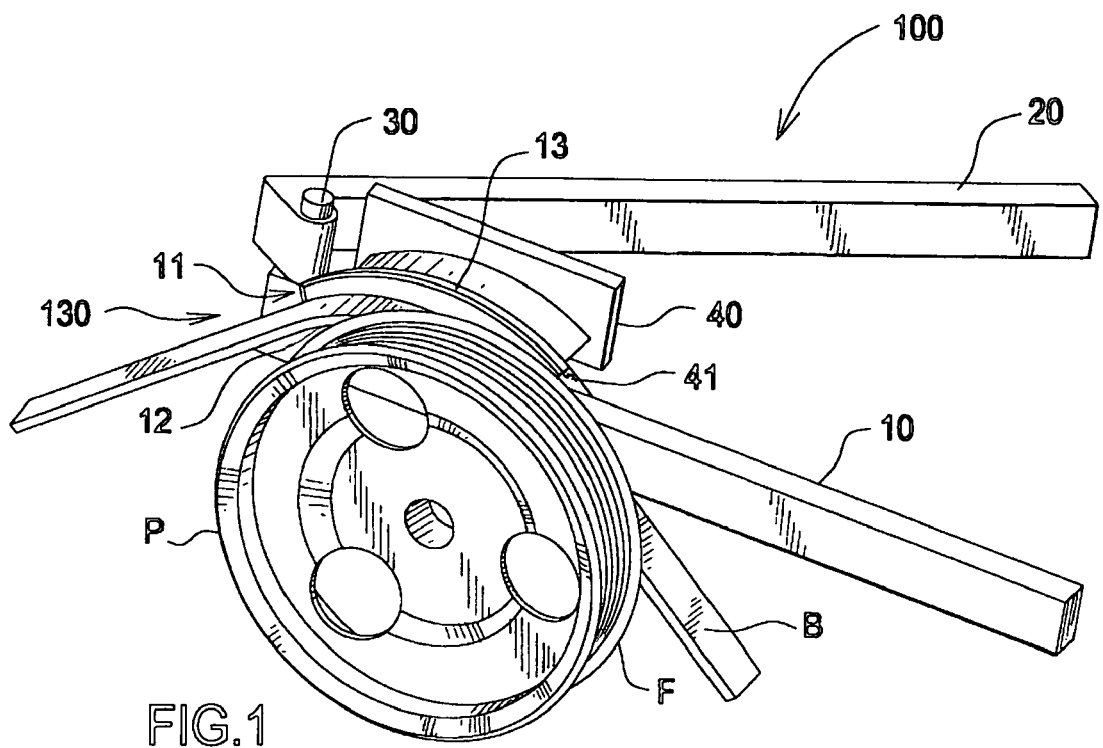
FIG. 1 is a front perspective view of the tool in use on a pulley.

FIG. 1 is a front perspective view of the tool in use on a pulley. Tool 100 is used to install a belt without rotating the pulley or tool. The tool pulls the belt to a desired radius or length, and then laterally urges the belt onto a pulley.

The tool comprises a ramp 11. Ramp 11 has a belt bearing surface 130 that has an arcuate shape and has substantially the same radius as the belt bearing surface S of a pulley P, see FIG. 2 and FIG. 3. Belt B rests on surface 130.

Figure 2:
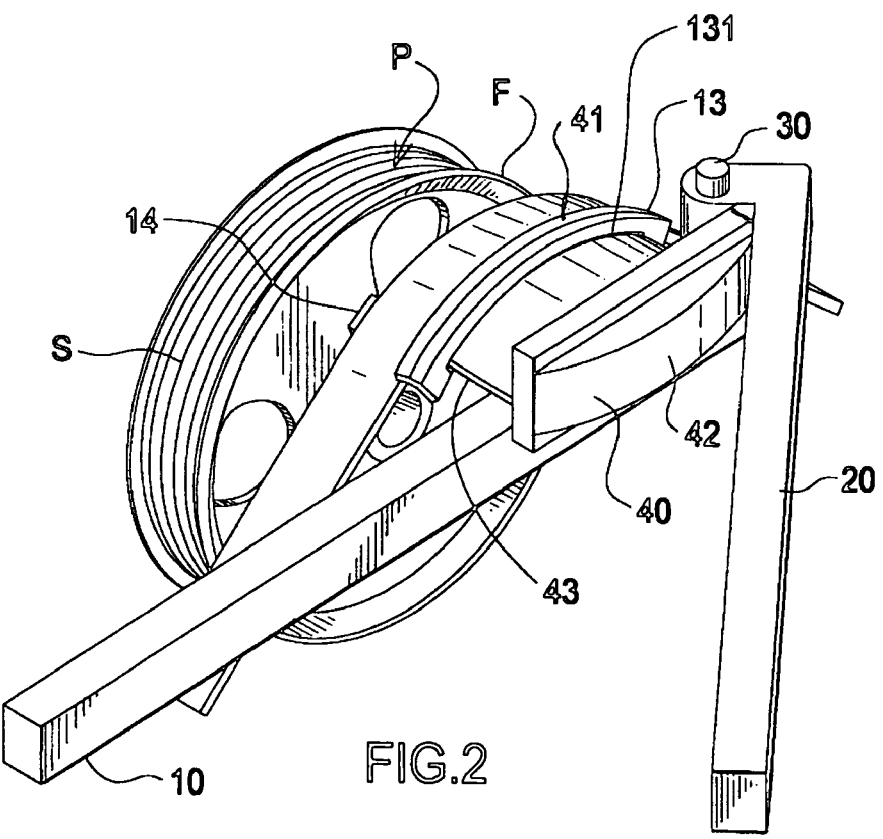
FIG. 2 is a rear perspective view of the tool in use on a pulley.

Referring to FIG. 2, ramp 11 also comprises flange 13 which positions a belt with respect to the tool 100 and surface 130. Flange 13 comprises slot 131 through which urging member portion 43 moveably projects. Portion 43 slides within slot 131.

Ramp 11 comprises connecting members 12, 14. The connecting members may comprise pins inserted in holes on the face of a pulley, or clamps disposed for engagement with a pulley flange F. In the preferred embodiment the connection members 12, 14 comprise clamps. Clamps 12, 14 are approximately 10 mm to 15 mm in length in a circumferential direction and are relatively short in radial height to minimize or eliminate the need to over-stretch the belt during installation. Namely, the clamps are of a radial height sufficient to reliably engage the pulley flange. In alternate embodiments each clamp may comprise a leaf spring attached to the underside of the ramp on the pulley side, or, may also comprise a portion stamped from ramp 11.

Lever arm 10 is connected to ramp 11. Pivot 30 is disposed at an end of lever arm 10. Lever arm 20 is pivotally connected to lever arm 10 at pivot 30. Lever arm 20 is aligned with bearing surface 42 such that lever arm 20 is in progressive pressing contact with surface 42 during use.

In an alternate embodiment lever arm 20 can be connected at a pivot to ramp 11. However, in this embodiment lever arm 20 also engages and acts upon surface 42 to laterally urge a belt.

A ramp size selected for each application should be slightly longer than the belt wrap angle about the pulley. This ensures that the belt completely clears the pulley as it is being installed. For example, if the belt wrap angle a on the pulley is approximately 45°, then the angular length of the ramp should be somewhat greater than approximately 45°. Of course, the principle of the device is equally suited to use with a ramp length less than a wrap angle, for example when sufficient ramp clearance is not available on an engine belt drive system pulley.

Figure 3:
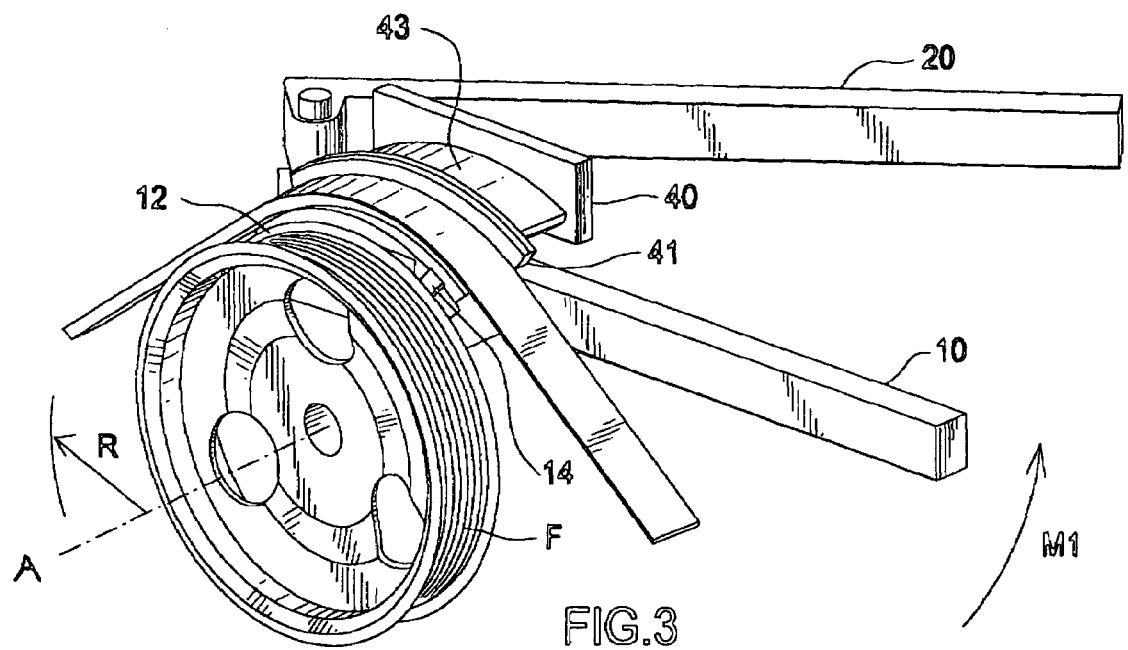
FIG. 3 is a front perspective view of the tool in use on a pulley.
Figure 4:
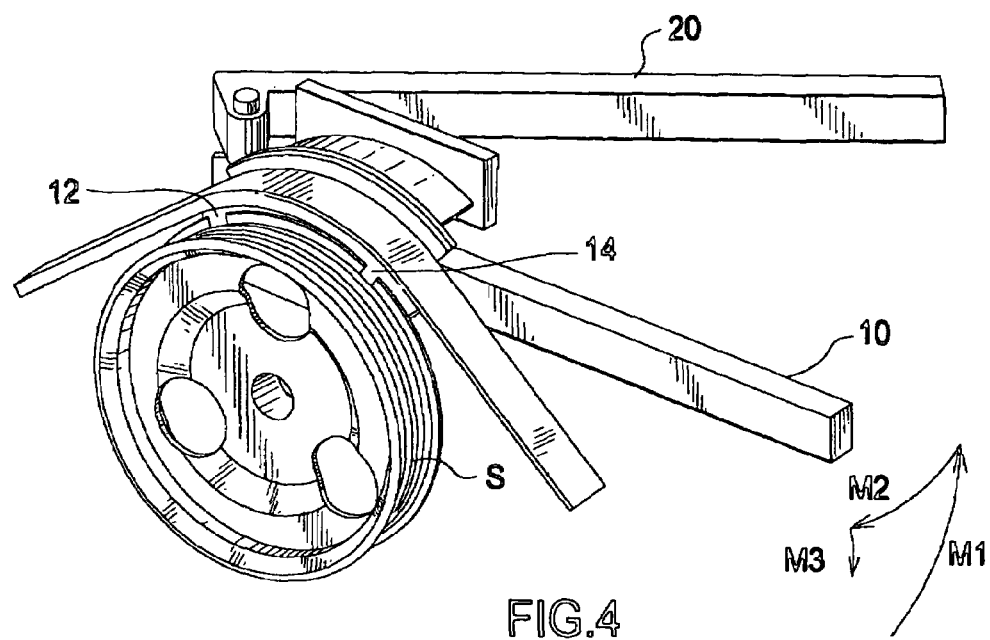
FIG. 4 is a front perspective view of the tool in use on a pulley.

Referring to FIG. 3 and FIG. 4, in use, ramp 11 is placed on the pulley flange on one side with a first clamp 12 engaged with a pulley flange F. The belt B is engaged with ramp 11 in a relaxed, loose position. Lever arm 10 is of a length sufficient to pry ramp 11 into place on the pulley P, for example, approximately 2 feet in length. Ramp 11 is pivoted about member 12 and thereby pulled radially outward by lever action of arm 10 until it is disposed outwardly enough to engage the second clamp 14 on the pulley flange F. In this position, with both clamps 12 and 14 engaged with the pulley flange F, the belt is at the proper predetermined radial position. However, at this point belt B is on ramp belt bearing surface 130, disposed adjacent to the pulley, but is not on the pulley surface S. The foregoing is accomplished without rotation of the pulley or rotation of the tool about a pulley rotation axis A, see FIG. 3.

Ramp 11 has no flange on the pulley side. On the other side of surface S, flange 41 is slightly radially thicker than the belt. Member 40 is slidingly engaged with ramp 11 through slot 131. This allows member 40 to slide on ramp surface 130 in a direction from flange 132 toward the pulley. Member 40 comprises surface 42 which is in pressing contact with arm 20. As member 40 is pressed by arm 20 portion 43 presses flange 41 against the side of belt B which in turn slidingly urges belt B laterally across belt bearing surface 130 into the pulley surface S. Arm 20 is approximately 2 feet in length, although this length is only exemplary and can be varied according to need. Once the belt is urged into the proper position in pulley P, the tool can then be removed.

For backside pulleys without a pulley flange, the ramp can also be used to install a belt without stretching the belt at all. Most automotive drives have a backside pulley on water pumps and idlers. Consequently, the ramp loading system can be used for non-low modulus belts in most cases. Also, most belt drive systems for mowing decks and garden tractors and similar products have a back side idler, which can easily be made with two or three holes/slots to which the ramp 11 is engaged.

FIG. 2 is a rear perspective view of the tool in use on a pulley. Arcuate surface 42 is engaged by arm 20 in a progressive motion of arm 20 during belt installation. As arm 20 moves it progressively engages surface 42 as the belt is progressively urged laterally onto pulley P. Member 43 slidingly engages surface 130 and slides through slot 131 in flange 132.

FIG. 3 is a front perspective view of the tool in use on a pulley. In order to connect clamp 14 to flange F, tool 10 is moved in the manner and direction M1. Ramp 11 pivots about clamp 12 which is engaged on pulley flange F. Movement of arm 10 in direction M1 radially moves ramp 11 outward whereby clamp 14 can then be engaged. Belt bearing surface 130 has a radius substantially equal to the radius R of the pulley P.

FIG. 4 is a front perspective view of the tool in use on a pulley. Completion of engagement of clamp 14 is effected by further moving arm 10 in direction M2, and then in direction M3.

Figure 5:
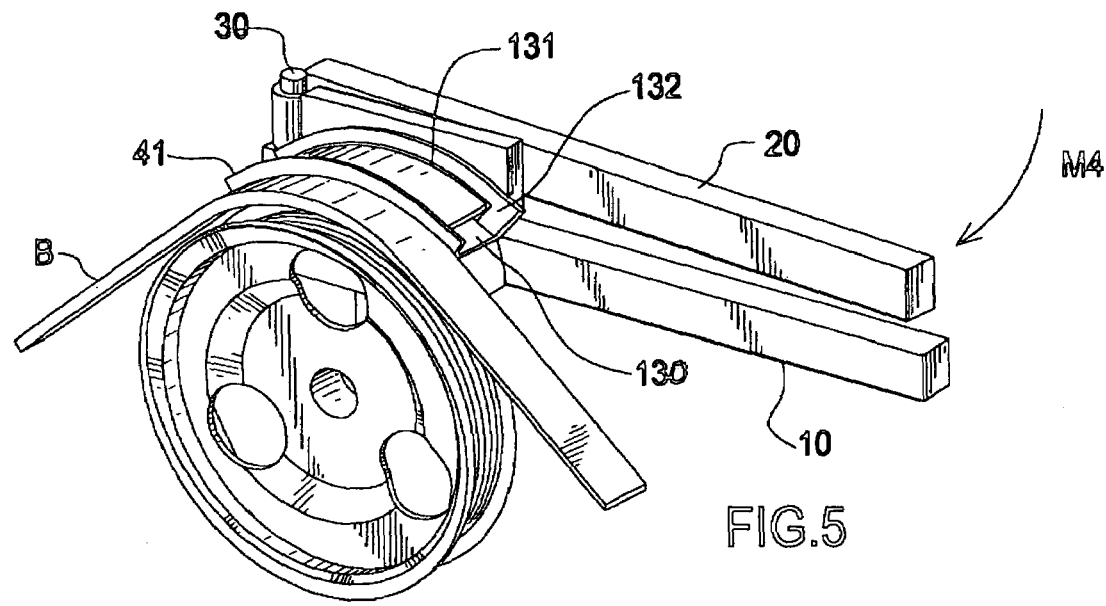
FIG. 5 is a front perspective view of the tool in use on a pulley.

FIG. 5 is a front perspective view of the tool in use on a pulley. Belt B is laterally urged onto pulley surface S by moving arm 20 in direction M4. Flange 41 urges belt B onto the pulley.

Figure 6:
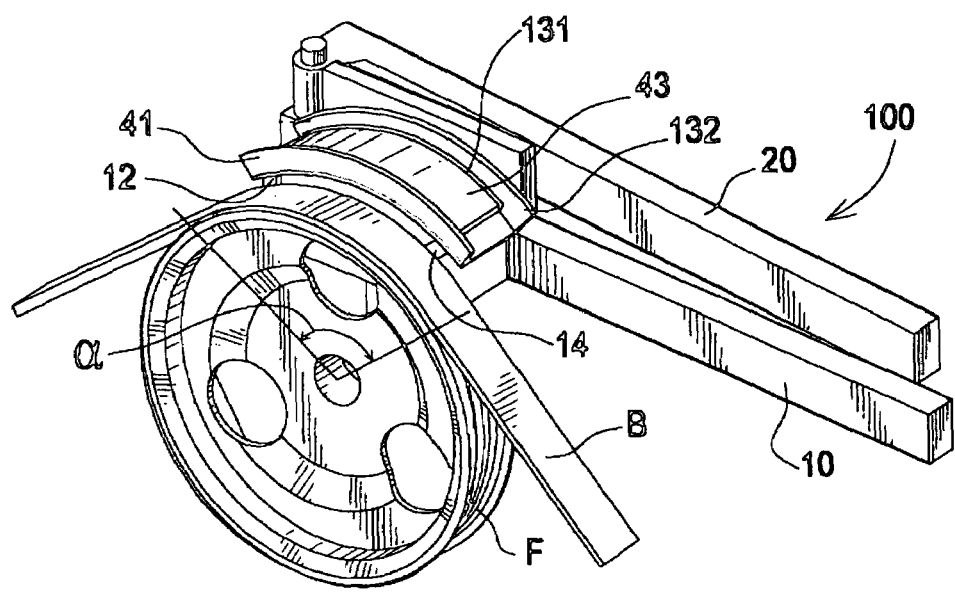
FIG. 6 is a front perspective view of the tool in use on a pulley.

FIG. 6 is a front perspective view of the tool in use on a pulley. Urging member 40 comprises arcuate urging member portion 43. Flange 41 projects radially from portion 43. Urging member 40 also comprises arcuate bearing surface 42.

Upon full movement of member 40, belt B drops into engagement with pulley P on surface S. In order to facilitate lateral movement of a belt B across belt bearing surface 130, a lubricant such as graphite or oil may be applied to the surface 130. Further, surface 130 may further comprise a low friction coating material such as PTFE or nylon or one of any other known low friction materials. The belt has an angle of wrap on the pulley of approximately $\alpha°$, which may vary according to belt drive system geometry. The length of belt bearing surface 130 on ramp 11 is preferably approximately equal to or greater than belt angle of wrap $\alpha°$.

The instant invention allows installation of a belt on a pulley system without rotating the tool or the pulley about a pulley axis of rotation. This capability significantly reduces potential system damage caused by rotating the pulley and attached accessories or engine components while the lubrication system is inoperative. It also reduces the opportunity for belt damage during installation caused by tools which slide under the belt or slide along a side of the belt as the belt is urged into a pulley groove. It also reduces the time required to install a belt by eliminated the need to adjust pulley centers to tension a belt.

Although forms of the invention have been described herein, it will be obvious to those skilled in the art that variations may be made in the construction and relation of parts without departing from the spirit and scope of the invention described herein.

I claim:

1. A belt installation tool comprising:
   an arcuate belt bearing surface having a first clamp member and a second clamp member for engaging a pulley;
   a first lever for pivoting the belt bearing surface about the first clamp member;
   the second clamp member cooperatively engaging a pulley with the first clamp member for holding the belt bearing surface in a predetermined position;
   a moveable member cooperatively disposed with the belt bearing surface for laterally urging a belt from the belt bearing surface to the pulley; and
   a second lever pivotally engaged with the first lever for urging the movable member.

2. The belt installation tool as in claim 1, wherein the member further comprises an arcuate surface for progressively engaging the second lever.

3. The belt installation tool as in claim 1, wherein the belt bearing surface has a radius substantially equal to a pulley radius.

4. The belt installation tool as in claim 1 wherein the belt bearing surface has a length approximately equal to or greater than a belt angle of wrap $\alpha°$ on the pulley.

5. The belt installation tool as in claim 1, wherein the belt bearing surface comprises a low friction material.

6. The belt installation tool as in claim 1, wherein the belt bearing surface is lubricated.

7. The belt installation tool as in claim 1, wherein the member further comprises a flange for engaging a belt.

* * * * *